March 29, 1949.  E. H. V. MOHME  2,465,812

MINNOW TRAP

Filed Oct. 9, 1947

INVENTOR.
Edward H. V. Mohme.
BY
Dodson and Dykeman
ATTORNEY

Patented Mar. 29, 1949

2,465,812

UNITED STATES PATENT OFFICE 2,465,812

MINNOW TRAP

Edward H. V. Mohme, University City, Mo., assignor to Champ-Items, Inc., St. Louis, Mo., a corporation of Missouri Application October 9, 1947, Serial No. 778,891

2 Claims. (Cl. 43—100)

My invention relates to devices which are used to catch live minnows. While I am aware there are many devices for this purpose they are all subject to one or more objections, which my invention will overcome.

The principal object of my invention is to provide an attachment which can be screwed onto any ordinary "Mason" type fruit jar.

A further object is to make my invention so that it will be very light and consequently easy to carry.

A further object is to construct my device so that it will afford a more ample entrance for the minnows or other small live fish to be used for bait.

A further object is to provide a construction which will produce a turbulence within the "Mason" jar which will prevent the bait, used to attract the minnows, from standing still thereby making the trap much more attractive and insuring a larger catch of minnows.

A further object is to provide anchoring means, preferably integral with the device, which will hold the trap in place and also prevent its being washed down stream by the current when it is used in a river.

A further object is to provide convenient means for the user to retrieve the trap.

My means of accomplishing the foregoing objects may be more readily comprehended by having reference to the accompanying drawings which are hereunto annexed and made a part of this specification in which.

Similar reference numerals refer to similar parts throughout the entire specification.

Figures 3, 4:
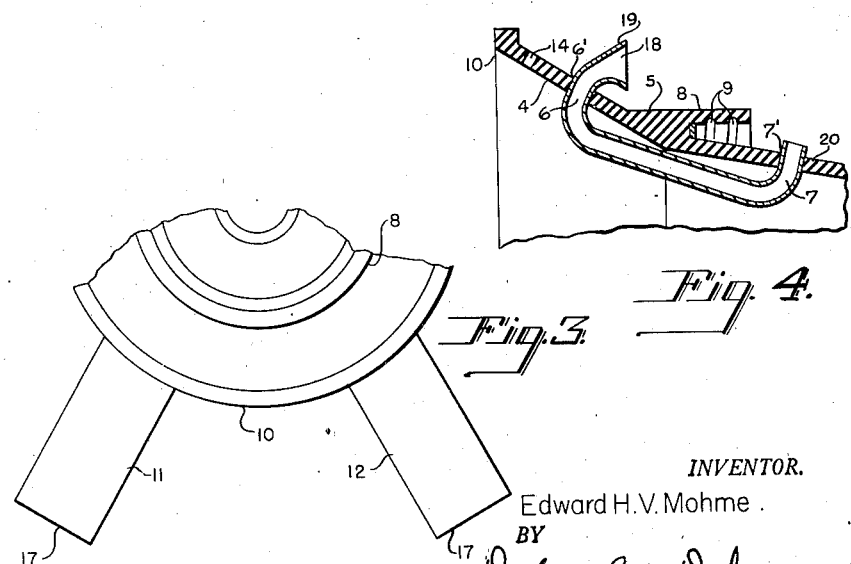
Fig. 3 is an enlarge fragmentary detail view showing the anchoring spades.
Fig. 4 is a detail view of the turbulence producer.

As shown in the drawings a "Mason" jar I is seen resting on the bottom 2 of a stream, the current of which is flowing in the direction indicated by the arrows. My improved trap, which is better seen in Fig. 4, is preferably formed of plastic which I have found makes the trap completely invisible to minnows; it is therefore superior to traps formed of other materials.

The trap A has a conical portion 3 which extends inside of the jar I and tapers towards it. The conical portion 3 is provided with a wide, outwardly flaring, mouth 4.

A boss 5 is formed on this outwardly flaring part 4 at its top. In front of this boss 5 I provide a hole 6', through which I pass or form a turbulence tube 18 having a nozzle 19. This tube 18 has a bent passage 6 which extends inside the conical portion 3 with another bent passage 7 extending through the hole 7' in the rear of the boss 5 to the exterior side 20 of the conical portion 3.

I provide an annular flange 8, the internal surface of this flange 8 is provided with threads 9 which are fitted to and coincide with threads 9', on the jar I.

At each side of the center line of the trap and adjacent the lip 10 of the mouth 4, I form two anchor spades 11 and 12, as shown they are cast or formed integral with the trap. It may be found more convenient to form them separately and detachably secure them to the mouth 8. Preferably the lip 10 of the wide mouth 4 is provided with a shoulder 13 which acts as a stiffener and a reinforcement.

Although I have referred to a "Mason" jar I do not desire to be understood as limiting myself thereto, as it will be clear to those skilled in the art that any type of threaded jar may be employed. An aperture 14 is provided adjacent the shoulder 13, on the lip 10, of the wide mouth 4, this affords convenient means to attach a line 16 to which may be secured a float (not shown) for the ready locating of the trap. The string or line 16 may be employed to retrieve the trap when the fisherman wishes to renew his bait.

The operation of my trap is as follows:

A plurality of cracker crumbs or other suitable food for minnows is placed in the jar I and the conoidal portion 3 is inserted in the jar bringing the threaded portion 9' thereof in position to be screwed onto the threads 9 on the flange 8.

Figure 1:
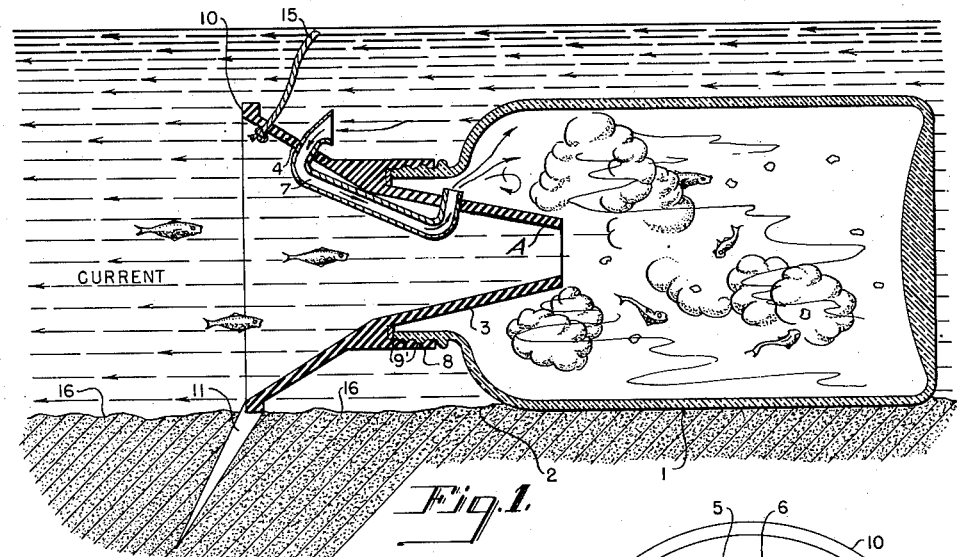
Fig. 1 is a side elevation of my improved minnow trap attached to a fruit jar of the well known "Mason" jar type.
Figure 2:
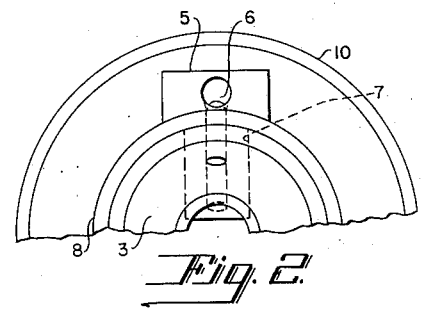
Fig. 2 is an enlarged fragmentary detail view of a portion of the end.

The jar and trap with its mouth open in the direction of the flow of the current, as shown in Fig. 1 by the arrows is then lowered to the bottom. The current will force the sharpened ends 17 of the anchor spades 11 and 12 into the river bed and thus hold the trap and jar in proper position.

The turbulence tube or passages 6 and 7 provide means whereby the current force will be transmitted to the still water inside the jar I and this force is sufficient to cause cracker crumbs or other light bait to move about inside the jar instead of lying on the bottom and in this manner attract more minnows.

The physics of this phenomenon is well established. The water inside the jar is relatively stationary. The current is running away from the open end of the jar and as it flows around the flared lip 10 of the trap a slight lessening of the pressure in front of the trap occurs. This lessened pressure is just sufficient to allow the current force exerted at the passage to cause a light convection movement inside the glass jar 1 which will cause the bread crumbs to stir gently with an erratic movement as if a slight air stream were disturbing them as were they on a dry surface and exposed thereto.

The minnows swimming against the current will contact the wide mouth 4, which will be practically invisible, and be directly through the conoidal portion 3 into the jar 1. When the fisherman requires fresh bait he draws the trap up by the string or line 16 and has a lively minnow, instead of the sluggish half dead ones found in the usual minnow bucket. This is due to the constant flow of fresh water into the jar 1, through the turbulence hole 6 and passage 7 which insures proper and suitable environment for the minnows.

Having obtained his fresh minnow the jar and trap are quickly lowered into the stream so that the jar may be continuously supplied with fresh water.

Although I have described with some detail a specific form for my trap I do not desire to be limited thereby except as such limitation may appear in the hereinafter contained claims.

Having described my invention, what I regard as new and desire to secure by Letters Patent is:

1. In a trap attachment, a substantially conical shaped member having a flange at its base end, a projection extending outwardly from said base at an angle to the longitudinal axis of the member, a thickened portion intermediate the ends of the member, an internally-threaded portion adjacent the smaller end of the member, said internally threaded portion and said thickened portion constituting means adapted to hold the attachment on a screw threaded end of a container, and a turbulence tube having curved bends extending through the wall of said member, one bend having a conically shaped nozzle formation facing in a direction opposite to the base of the member, said nozzle formation extending outwardly beyond the thickened portion and the other curved bend extending outwardly through the wall of the member at a point between the internal threads and the small end of the member but sufficiently close to the exterior wall of the member so as to provide a space between said end of the latter curved bend and internal wall of a container when secured to the attachment.

2. In a trap attachment, a substantially conical shaped member having a flange at its base end, projecting means extending outwardly from said base at an angle to the longitudinal axis of the member, means attached to said flange opposite from said projecting means to raise and lower said attachment, a thickened portion intermediate the ends of the member, an internally threaded portion adjacent the smaller end of the member, said internally threaded portion and said thickened portion constituting means adapted to hold the attachment on a screw threaded end of a container, and a turbulence tube having curved bends extending through the wall of said member, one bend having a conically shaped nozzle formation facing in a direction opposite to the base of the member, said nozzle formation extending outwardly beyond the thickened portion and the other curved bend extending outwardly through the wall of the member at a point between the internal threads and the small end of the member, but sufficiently close to the exterior wall of the member so as to provide a space between said end of the latter curved bend and internal wall of a container when secured to the attachment.

EDWARD H. V. MOHME.

REFERENCES CITED

The following references are of record in the file of this patent:

UNITED STATES PATENTS

| Number | Name | Date |
|---|---|---|
| 693,391 | Holland | Feb. 18, 1902 |
| 1,082,998 | Briggs | Dec. 30, 1913 |

FOREIGN PATENTS

| Number | Country | Date |
|---|---|---|
| 310,389 | Germany | Jan. 17, 1919 |